Dec. 30, 1930.  E. A. JOHNSTON ET AL  1,786,850
ENSILAGE HARVESTER
Filed Dec. 8, 1927   3 Sheets-Sheet 1
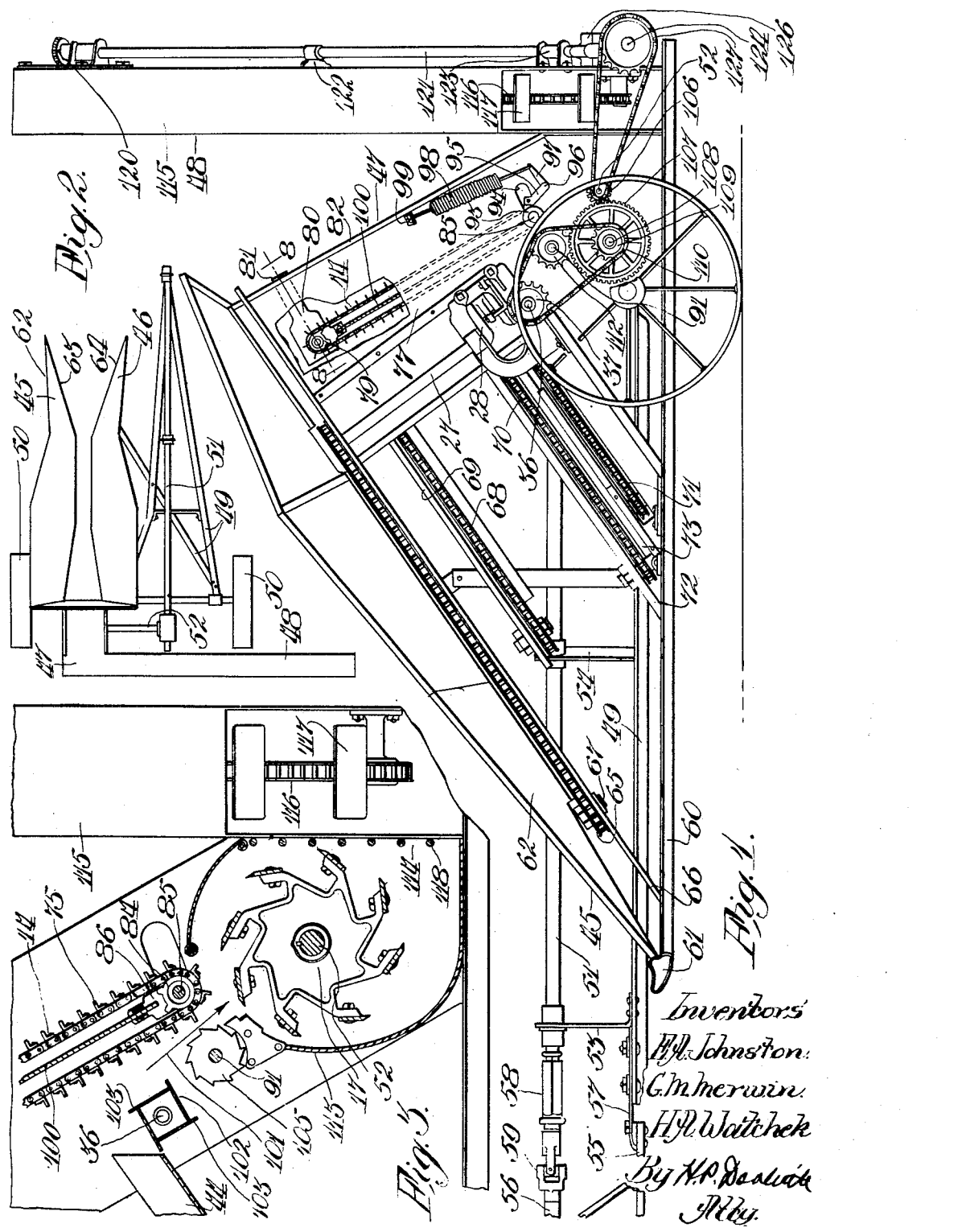

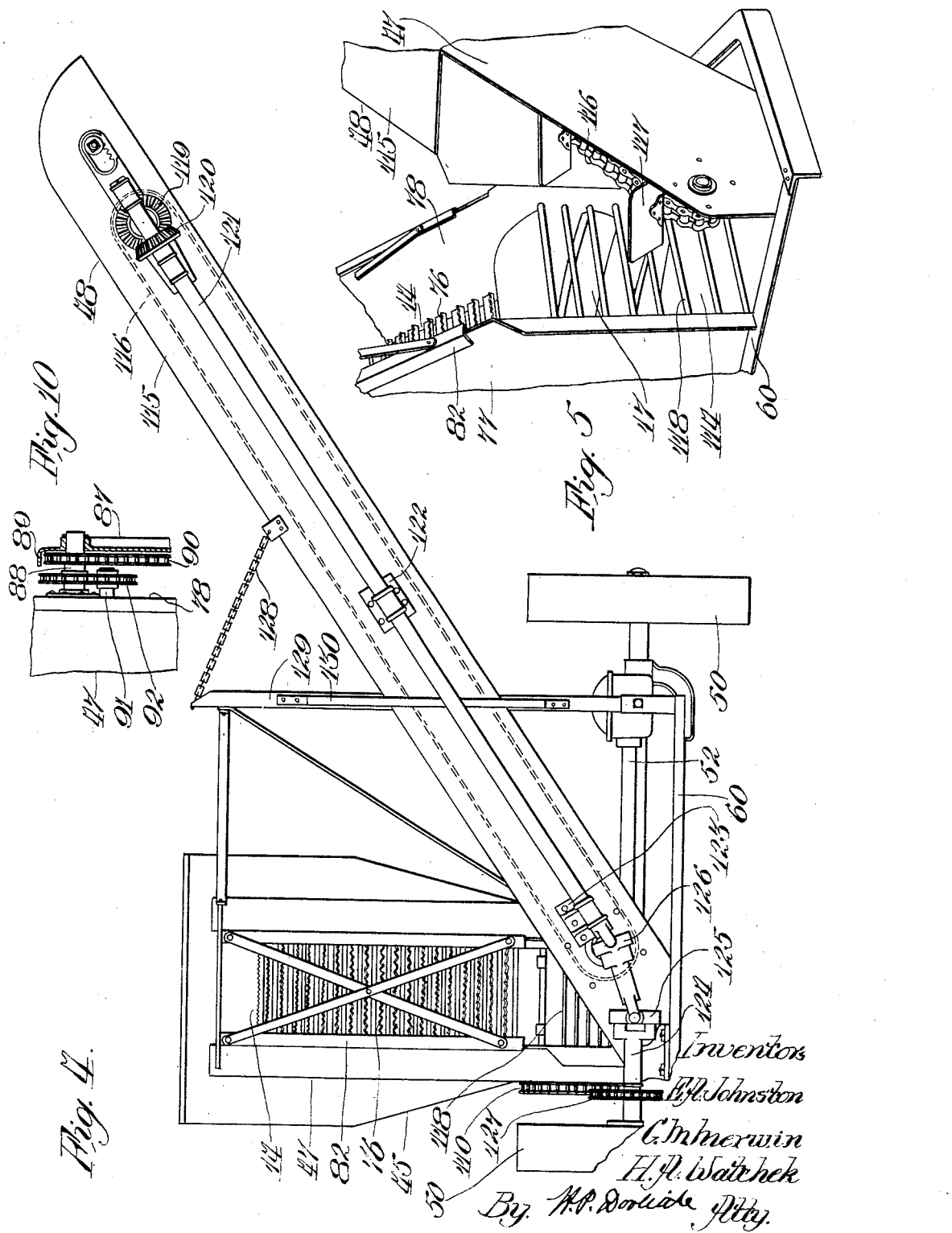

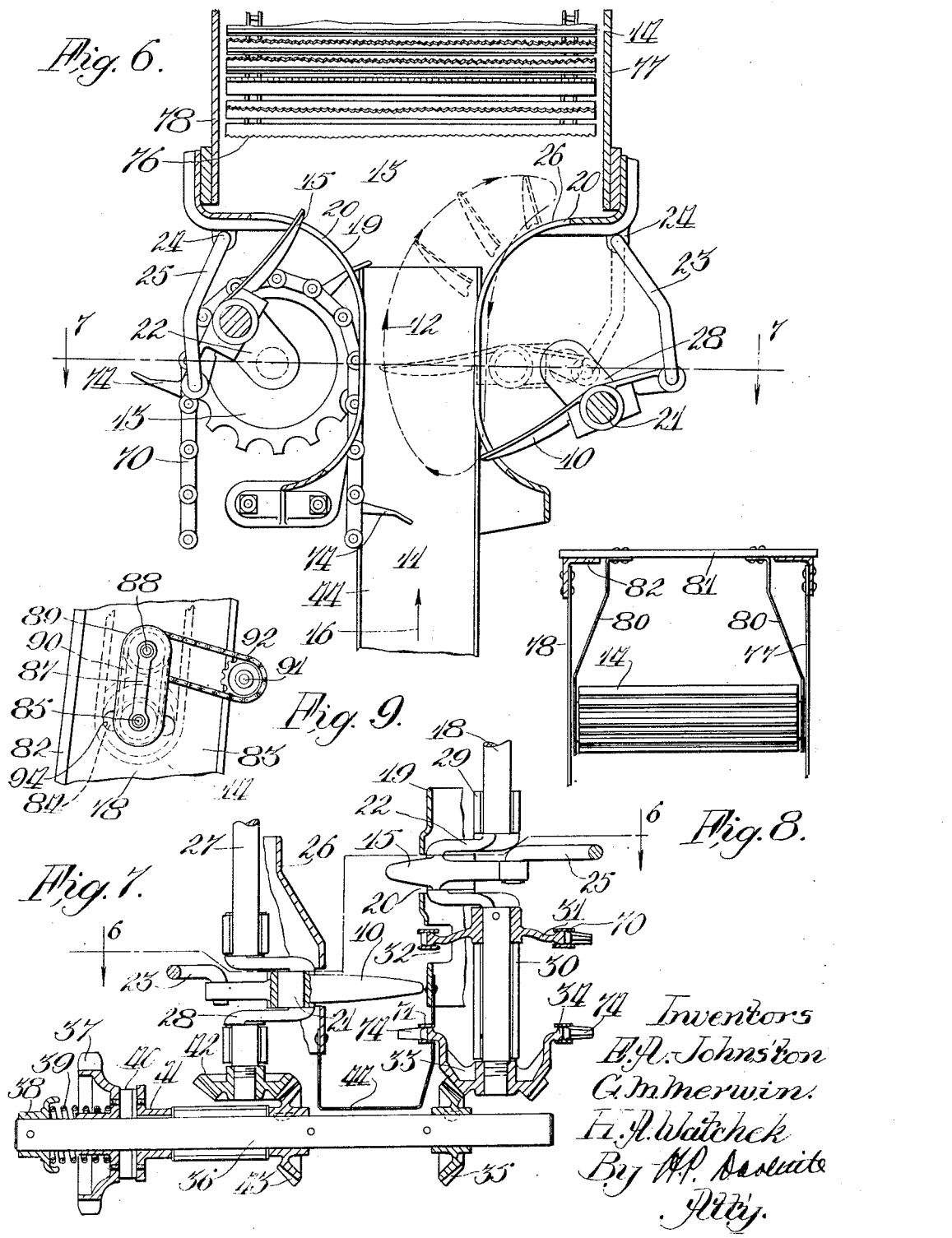

Patented Dec. 30, 1930

1,786,850

UNITED STATES PATENT OFFICE

EDWARD A. JOHNSTON, GEORGE M. MERWIN, AND HARRY A. WATCHEK, OF CHICAGO, ILLINOIS, ASSIGNORS TO INTERNATIONAL HARVESTER COMPANY, A CORPORATION OF NEW JERSEY

ENSILAGE HARVESTER

Application filed December 8, 1927. Serial No. 238,477.

This invention relates to improvements in portable field machines of the class known as ensilage harvesters. Such machines cut standing stalks of corn as they are drawn along a row and at the same time cut the stalks so as to form ensilage.

In order that these machines may be practical they must be capable of operation when drawn along a row of corn at a fairly high speed. Under this condition severed stalks of corn are relatively rapidly delivered to a cutting mechanism for forming the stalks into ensilage. It is desirable that the ensilage cutting mechanism be as small and light as possible and yet have sufficient capacity for taking care of all of the stalks which are delivered to it as the machine moves along the row.

The present invention has for one of its objects the provision of means for so acting upon the stalks as they are about to be fed to the ensilage cutter that the latter will always be acting at a sufficient proportion of its full capacity to take care of the stream of stalks delivered to it. This means is intended to prevent clogging of the ensilage cutter and consequent delays in the operation of the machine in the field.

More specifically stated, the above mentioned object of the invention is to provide a distributor so co-acting with a feeding means for the ensilage cutter that stalks of corn are uniformly presented to the feeding means, which consequently may present a uniform stream of stalks across the entire operative face of the ensilage cutter.

Another object of the invention is to present an ensilage harvester having improved structure whereby the ensilage cutter may be protected from damage in the event that the ensilage elevator breaks.

Other objects of the invention will appear as the following description proceeds.

An illustrative embodiment of the invention is shown in the accompanying drawings, in which:

Figure 1 is a side elevation of an ensilage harvester;

Figure 2 is a plan of the machine shown in Figure 1;

Figure 3 is a vertical sectional view illustrating the relation of the feeding mechanism, the cutter head, and the ensilage elevator;

Figure 4 is a rear elevation of the machine shown in Figures 1 and 2;

Figure 5 is a detail perspective view showing the arrangement of parts at that corner of the machine where the ensilage elevator cooperates with the cutter head to remove the ensilage as it is formed by the latter;

Figure 6 is substantially an inclined section taken on the line 6—6 of Figure 7 showing the operation of the distributor and the relation of its parts to the stalk passage and to the feeding mechanism;

Figure 7 is substantially an upright sectional view taken on the line 7—7 of Figure 6 looking in the direction of the arrows and illustrating the parts of the distributor, and particularly showing the manner in which the distributor is operated;

Figure 8 is a sectional view on line 8—8 of Figure 1;

Figure 9 is a detail view in side elevation of the mechanism for operating the rearwardly yieldable feeding mechanism 14; and Figure 10 is partly an elevation and partly a transverse section of the same operating mechanism.

The illustrative ensilage harvester has a distributor comprising an arm 10 projectable into the stalk passage 11 illustrated in Figure 6 of the drawings. The movement of the trip of the arm 10 is illustrated by the dot and dash line 12, such movement being in the direction of the arrows on that line. By this movement stalks moving along the passageway 11 are positively forced rearwardly and outwardly into the feeding throat 13 so as to be uniformly distributed and spread over the face of the abutting upright feeding mechanism 14.

As the arm 10 moves rearwardly, some of the stalks which are in engagement therewith at the mid-portion of its path of movement move out of engagement with the arm as the latter passes toward a side of the feeding mechanism. Those stalks which remain in contact with the arm 10 are moved outwardly until they come into positions along one margin of the feeding mechanism.

The distributor shown in Figure 6 includes a second arm 15 so acting at the side of the stalk passage 11, opposite from the arm 10, that the stalks in the passage are alternately subjected to distributing or separating movements of the two arms. As the arm 15 is completing its movement within the stalk passage, the arm 10 is just about to begin a similar movement, the path of which is indicated by the dotted line 12. The stalks are thus constantly being positively impelled toward the feeding mechanism 14 and so distributed over the entire face of that feeding mechanism that the latter may have a uniform layer of stalks to act upon at all times.

Another way of considering the distributor is that it acts from opposite sides upon a stream of stalks passing along the stalk passage 11 in the direction of the arrow 16 to spread or widen that stream to fill the throat 13 and constantly press the stalks against the feeding mechanism 14. The throat 13 is thus constantly kept filled with a compacted mass of stalks which are constantly being moved downwardly to a cutter 17.

In practice, the distributor arm 10 is impelled by an upright crank shaft 18 journaled outside the stalk pasage wall 19, which is provided with a slot 20 through which the arm is projected. The arm 10 is journaled intermediate its ends upon the crank pin 21 of crank 22, as clearly shown in Figure 6 of the drawings.

To give the arm 10 the movement indicated in the dotted lines in Figure 6, its outer end is pivotally connected to a link 23, the outer end of which is shown pivotally related to the wall 20 at 24. The opposite arm 15 is similarly connected by a link 25 to a fixed part herein shown as the opposite wall 26 of the stalk passage 11. This arm is mounted upon a crank shaft 27 having a crank 28 shown at a position lower than the position of the crank 22. The crank shaft 18 is journaled in bearings 29 and 30 between which a gatherer chain sprocket 31 is positioned. This sprocket is fixed upon the shaft 18 to produce results hereinafter described. In Figure 7, the sprocket 31 is shown in position to operate through an opening 32 in the wall 19. Below sprocket 31, the shaft 18 carries a unitary structure providing a bevel gear 33 and a gathering chain sprocket 34. The former meshes with a bevel pinion 35 fixed to a counter-shaft 36. This shaft is shown equipped with a driving sprocket wheel 37 normally maintained in driving connection with the counter-shaft by a spring release clutch mechanism including the fixed collar 38, the spring 39, the driven clutch element 40, and the driving clutch element 41. the latter being preferably keyed to the counter-shaft.

The crank shaft 27 is driven by a bevel gear 42 fixed thereon. This gear meshes with a driving bevel pinion 43 fixed upon the counter-shaft 36. It will be noted that the pinion 43 is on the right hand side of gear 42 (as shown in Figure 7) and that the pinion 35 is on the left hand side of gear 33, so that the shafts 18 and 27 are driven in opposite directions, as is required by the operation of the arms 10 and 15. Figure 7 of the drawings also discloses the relation of the pan or stalk guide 44 to the described mechanism. This pan is secured to the walls 19 and 26 to complete a chute for guiding the stalks to the feeding mechanism 14.

The above described mechanism is supported and driven by an organization making up a field machine for cutting corn stalks and making ensilage therefrom. This organization is shown in the remaining views of the drawings and will now be described. Figure 1 shows in a diagrammatic manner the general arrangement of the parts of this organization. It includes stalk gatherers 45 and 46 located on opposite sides of the stalk passage 11 for guiding the stalks to the operative parts of the machine. Each gatherer includes a number of operative elements which will be later described. Rearwardly of the gatherers is a casing 47 containing the cutter 17 and having a lateral extension 48 containing an elevator for delivering ensilage to a barge. All of these parts are carried by a frame 49 supported by wheels 50 and having a long forward extension carrying a power shaft 51 operatively connected to a counter-shaft 52 upon which the cutter 17 is fixed. The power shaft 51 is journaled in uprights 53 and 54 carried by the frame 49, as shown in Figure 1 of the drawings. In Figure 6, the machine is illustrated as pulled and operated by a tractor having a drawbar 55 and a power take-off 56. The former is connected to the frame by a draft member 57, and the power take-off 56 is operatively connected to the shaft 51 by means of a telescoping shaft construction 58 and a universal joint 59. The gatherers 45 and 46 are mounted upon an auxiliary frame 60 which is preferably vertically adjustable relative to the frame 49 by means of any suitable adjusting mechanism, for the purpose of raising and lowering the gatherers. The gatherers include gatherer points 61 of a construction well known in the art. Rearwardly of these points boards 62 form the rearwardly converging walls 63 and 64 of the stalk passage 11. The relative arrangement of the walls of this passage is clearly shown in Figure 2.

Beneath a board 62 is a top gathering chain 65 trained at its upper end around a sprocket wheel carried by the shaft 27, and at its lower end around an idler sprocket carried by a support 66 at 67. This chain preferably has some of its links provided with lugs which project into the stalk passage 11 so as to move the stalks toward the feeding mechanism 14. Beneath the top gathering chain is an intermediate sprocket chain 68 carried by a support 69 and arranged so as to assist in the movement of the stalks, as above indicated. Below the gathering chain 68 are located butt gathering chains 70 and 71 mounted similarly to the top gathering chain upon supports 72 and 73, respectively. The lower butt gathering chain 70 is shown somewhat in detail in Figure 6 of the drawings. It carries stalk moving lugs 74 projecting into the stalk passage 11 and is trained at its rearward end around the sprocket wheel 34. The butt gathering chain 70 is trained at its rearward end around the sprocket wheel 31 shown in Figure 7.

The feeding mechanism indicated generally by the numeral 14 is herein shown as an endless conveyer inclined as indicated in Figures 1 and 3 of the drawings. This conveyer carries transverse cleats 75, which are roughened, as indicated at 76 in Figures 4 and 5 of the drawings. This enables the feeding mechanism to maintain an effective grip upon stalks fed downwardly to the cutter 17. In order that the throat 13 may have a varying capacity, the upper end of the feeding mechanism 14 is arranged so as to be yieldable rearwardly between the walls 77 and 78 shown in Figure 6 of the drawings. The conveyer is trained around upper sprockets 79 carried by movable supports 80, which are secured to a bar 81 engaging the rear wall 82 to limit the forward movement of the conveyer, as indicated in Figure 8 of the drawings. In this figure the side walls 77 and 78 are shown. These walls constitute the upward continuation of the casing which surrounds the cutter 17. The feeding mechanism 14 may yield under the influence of an unusually heavy load packed into the throat 13 by the arms 10 and 15. When this yielding takes place, the bar 81 moves rearwardly away from the walls 82 and the casing.

The lower conveyer sprockets 84 are secured to a shaft 85 journaled in bearings 86, which are movable fore and aft relative to the rear wall 82. At one end of the shaft 85 a link 87 rotatably supports the shaft so that it is movable about the axis of a counter-shaft 88 secured to a wall 78, as indicated in Figure 10 of the drawings. In the present instance, the link 87 also has an extension forming a housing 89 for sprocket gearing 90 which connects shafts 88 and 85 so that they must rotate in unison. The shaft 88 is driven from a second counter-shaft 91 rotatably journaled and carried by the forward wall of the cutter casing, as indicated in Figure 9 of the drawings. A sprocket chain 92 connects sprocket wheels fixed to the shafts 88 and 91. The other end of the shaft 85 is rotatably supported in a journal box 93 which is movable in fore and aft directions in a slot 94 formed in the wall 77. This journal box is pivotally attached to an arm 95 of a bell crank lever pivotally mounted at 96 and having its second arm 97 tensioned upwardly by a spring 98, and one end of which is fixed to the wall 77, as indicated at 99. It will be understood that this arrangement of elements causes the feeding mechanism 14 to be capable of yielding rearwardly, but at the same time to impose a considerable resistance to any such movement. The shafts at the upper and lower ends of the feeding mechanism, or conveyer 14, are held in parallelism, and the feeding mechanism is caused to move rearwardly as a unit, by reason of the interposition of a plate or strut 100 extending between and secured to the journal boxes for the upper and lower shafts of the feeding mechanism.

Referring to Figure 3 of the drawings, after the stalks leave the guide 41, they are impelled along a path indicated by the arrow 101. The stalks, besides being distributed in packed condition across the face of the feeding mechanism 14, are compacted or pressed against the feeding mechanism by a packer or feeder 102. This feeder is herein shown as having projections 103 for more effectively engaging the stalks, pressing them against the feeding mechanism 14, and assisting them in feeding the stalks downwardly in the path of movement indicated by the arrow 101. This feeder or packer is mounted upon the shaft 36 and is shown as having central or core construction which is substantially square in cross section. Beneath the feeder 102 is a supplementary feeder herein shown as a toothed roller 105 fixed upon a shaft 91. The action of this supplementary feeder is much the same as that of the feeder 102. The shafts 36 and 91 are driven from the shaft 52 by the interposition of gearing shown in Figure 1 of the drawings. This gearing includes a spur pinion 106 fixed upon the shaft 52, a spur gear 107 meshing with the spur pinion 106 and fixed to a counter-shaft 108 to which is also fixed a sprocket wheel 109. This sprocket wheel drives a sprocket chain 110 which is trained over sprocket wheels 37 and 112 secured, respectively, to the shafts 36 and 91.

The cutter 17 is surrounded by a substantially circular casing 113 having an outlet 114 into the lower end of an elevator casing 115, as indicated in Figures 3 and 5 of the drawings. This elevator casing houses an endless conveyer 116 having scoops or buckets 117 for carrying the ensilage to an elevated delivery port. Because of the fact that substantial quantities of ensilage are moved upon this elevator, it sometimes happens that the endless conveyer breaks so that its component parts pile up in the lower end of the casing 115. Serious damage has been done to the cutter corresponding to the cutter 17 when a conveyer breaks in this manner. In the present instance contact between the cutter 17 and the parts of the endless conveyer 116 is prevented by the interposition of a guard herein shown as a grating comprising horizontal rods or bars 118 extending across the outlet 114.

The endless conveyer is driven from its top through the intermediacy of bevel gears 119 and 120, the former of which is fixed to a rotatable shaft carrying the upper end of the conveyer. The bevel gear 120 is fixed upon an inclined shaft 121 journaled on the side of the casing 115, as indicated at 122 and 123. The lower end of the shaft 121 is operatively connected to a counter-shaft 124 by means of universal joints 125 and 126. The counter-shaft 124 is driven from the shaft 52 by means of a sprocket chain 127.

A wagon is usually pulled along beneath the upper end of the elevator 115. For the purpose of adjusting the delivery end of the elevator to enable the machine to feed to wagons of different heights, the elevator is pivotally supported at its lower end upon a horizontal axis and it is held in any position to which it is adjusted, by means of a link chain 128 which may be slipped into a notch in the upper end of the support 129. The elevator is guided during vertical adjustment by means of a strap 130 cooperating with the support 129 to form vertical guideways on opposite sides of the elevator casing.

Whereas the invention has been descirbed with reference to a particular machine, it is to be understood that it is not limited thereto, but that it is of a scope commensurate with the breadth of the subjoined claims.

What is claimed as new is:

1. A harvester comprising an ensilage forming cutter, stalk guides forming a stalk passageway leading to the cutter, an abutment for guiding the stalks toward the cutter, and distributor means operated laterally with respect to the abutment for uniformly spreading stalks across the face thereof.

2. A field machine for cutting corn stalks and making the stalks into ensilage comprising an ensilage cutter, stalk guides forming a passage leading to the cutter, means for moving the stalks along the passage, and a distributor positively engaging and moving stalks progressing along said passage so as to uniformly distribute the stalks across the face of the cutter.

3. A field machine for cutting corn stalks and making the stalks into ensilage comprising an ensilage cutter, stalk guides forming a passage leading to the cutter, means for moving the stalks along the passage, and a distributor having arcuately moving arms for positively engaging and moving stalks progressing along said passage so as to uniformly distribute the stalks across the face of the cutter.

4. An ensilage harvester comprising an ensilage cutter, stalk guides forming a passageway leading to the cutter, means engaging stalks to move them along the passageway, distributor arms, and means to project the arms into the stream of stalks moving along said passageway and to thereafter move said arms outwardly with reference to the longitudinal median line of the passageway.

5. An ensilage harvester comprising an ensilage cutter, stalk guides forming a passageway leading to the cutter, means engaging stalks to move them along the passageway, distributor arms projectable into the passageway from opposite sides thereof, and means to project the arms into the stream of stalks moving along said passageway and to thereafter move said arms outwardly with reference to the longitudinal median line of the passageway.

6. A harvester comprising an ensilage cutter, guides forming a passageway for a stream of stalks passing to the cutter, means for moving stalks along the passageway, a transverse and movable abutment against which the stalks may be distributed and packed, and means for uniformly packing the stalks against said abutment.

7. A harvester comprising an ensilage cutter, guides forming a passageway for a stream of stalks passing to the cutter, means for moving stalks along the passageway, a yieldable abutment against which the stalks may be distributed and packed, distributor means, and means to move said arms through the passageway so that they will pack stalks against the abutment and uniformly distribute the stalks across the face of the cutter.

8. A harvester comprising an ensilage cutter, guides forming a passageway for a stream of stalks passing to the cutter, means for moving stalks along the passageway, a yieldable feeding mechanism against which the stalks are distributed and packed, and means for uniformly distributing the stalks across the face of the feeding mechanism.

9. A portable field machine for cutting standing corn stalks and making ensilage from the cut stalks comprising a rotary cutter head, a casing substantially enclosing the cutter head, an elevator for removing ensilage from the outlet of the casing, and a grating across said outlet and located between the elevator and the cutter head.

10. A field machine for cutting standing corn and making ensilage comprising, in combination, an ensilage cutter, feeding mechanism for presenting stalks to the cutter, means for driving said feeding mechanism, means for supporting said feeding mechanism so that it will be yieldable rearwardly, walls forming a stalk passage less than the width of the feeding mechanism and leading to the feeding mechanism, means for moving stalks in upright positions along said passage, distributor arms projectable into the stream of stalks passing along said passage from each side thereof, means for moving said arms toward the feeding mechanism after they are projected into the passage, means for moving said arms outwardly toward the edges of the feeding mechanism as they approach the end of their movement while in engagement with the stalks, means for retracting the distributor arms from contact with the stalks and returning them to a forward position from which they are again projected into the stalk passage.

11. An ensilage harvester comprising, in combination, a wheel supported main frame, an ensilage cutter rotatably carried by the frame, means for cutting standing corn, means for feeding the cut stalks to the cutter, a supplementary frame carrying the stalk cutting means, means for vertically adjusting the supplementary frame with reference to the main frame, a shaft journaled transversely of the main frame and carrying the cutter keyed thereon, a longitudinal drive shaft extending substantially the full length of the main frame, means for rotatably supporting said longitudinal shaft above the main frame, gearing connecting the transverse shaft and the longitudinal shaft, a telescoping shaft construction at the forward end of the longitudinal shaft, and a universal joint construction operatively connected to the telescopic shaft construction and so arranged as to drive the cutter by reason of its connection to the power take-off of a tractor.

12. An ensilage harvester comprising, in combination, a wheel supported frame, means for cutting standing stalks, a cutter for forming ensilage from the stalks, means for feeding the stalks to the cutter, an elevator for receiving the ensilage from the delivery end of the cutter and transferring it to an elevated position of delivery at one side of the machine, and driving mechanism transmitting movement to the upper end of the elevator for operating the same.

In testimony whereof we affix our signatures.

EDWARD A. JOHNSTON.
GEORGE M. MERWIN.
HARRY A. WATCHEK.